US012027034B2

(12) United States Patent
Railton et al.

(10) Patent No.: US 12,027,034 B2
(45) Date of Patent: Jul. 2, 2024

(54) IMAGING TECHNOLOGY ALARM SYSTEM FOR HEALTHCARE PROFESSIONALS

(71) Applicant: S&S System Designs LLC, Hood River, OR (US)

(72) Inventors: Shari Lynn Railton, Hood River, OR (US); Sidney Lynn Perkins, White Salmon, WA (US)

(73) Assignee: S&S SYSTEM DESIGNS LLC, Hood River, OR (US)

( * ) Notice: Subject to any disclaimer, the term of this patent is extended or adjusted under 35 U.S.C. 154(b) by 0 days.

(21) Appl. No.: 18/528,278

(22) Filed: Dec. 4, 2023

(65) Prior Publication Data

US 2024/0185704 A1 Jun. 6, 2024

Related U.S. Application Data

(60) Provisional application No. 63/429,924, filed on Dec. 2, 2022.

(51) Int. Cl.
*G08B 25/12* (2006.01)
*G08B 21/02* (2006.01)

(52) U.S. Cl.
CPC ............ *G08B 25/12* (2013.01); *G08B 21/02* (2013.01)

(58) Field of Classification Search
CPC .................................................... G08B 25/12
See application file for complete search history.

(56) References Cited

U.S. PATENT DOCUMENTS 5,910,771 A * 6/1999 Stumberg .......... G08B 21/0453 340/521
2017/0172527 A1* 6/2017 Uber, III ............. A61B 6/5264

FOREIGN PATENT DOCUMENTS

JP 05269096 A * 10/1993

* cited by examiner

*Primary Examiner* — Travis R Hunnings
(74) *Attorney, Agent, or Firm* — Maschoff Brennan

(57) ABSTRACT

An alarm system may include a first pneumatic actuation bulb positioned at a first location that includes no electronic components and a first pneumatic tubing connecting the first pneumatic actuation bulb to a first pneumatic switch coupled to an alarm console at a second location different from the first location. The alarm console and a first alarm of the alarm console may be configured to operate using electronic components. The first alarm may provide a first alarm signal responsive to usage of the first pneumatic actuation bulb. A second pneumatic actuation bulb may be positioned at the first location and connected to the alarm console via a second pneumatic tubing and a second pneumatic switch. The alarm console may include a second alarm that provides a second alarm signal responsive to usage of the second pneumatic actuation bulb.

20 Claims, 2 Drawing Sheets

IMAGING TECHNOLOGY ALARM SYSTEM FOR HEALTHCARE PROFESSIONALS

CROSS-REFERENCE TO RELATED APPLICATIONS

This application claims the benefit of U.S. Patent Application Ser. No. 63/429,924, filed on Dec. 2, 2022; the disclosure of which is incorporated herein by reference in its entirety.

FIELD OF THE INVENTION

The present disclosure generally relates to an imaging technology alarm system for healthcare professionals.

BACKGROUND

Health care professionals are often in a setting in which they are working alone and vulnerable. This environment can result in very stressful situations when, for example, their patient has an event that is life compromising. In the case of a Magnetic Resonance Imaging (MRI) technologist, they are often working alone. Situations do arise when the technologist enters the scan room and the patient is in a life threatening state: i.e. cardiac arrest, seizure, contrast reaction, respiratory arrest, etc. In these situations the technologist is in a very compromised position as they need to leave the room to go to the nearest phone and call a "Code Blue" or "Rapid Response" directive on the hospital intercom system and then return to the patient to address their needs. This time away from the patient is a loss of valuable, possibly life-saving, time.

MRI magnets are extremely powerful. It is very dangerous to have anything that is ferromagnetic enter the MRI scanning room. There is a very stringent screening process before anyone or anything can enter the scan room. Therefore, personnel who normally respond to a "Code Blue" are not allowed to enter the scan room to care for the patient. In the case of a patient emergency, the MRI Technologist must immediately address the patient's needs, remove any scanning coils/equipment from the patient, then move the patient out of the scanning room for the code team to give the necessary care as quickly and safely as possible. Many people are not aware of the dangers associated with MRI. It is the MRI technologist's job to be in control during this situation. They must make sure the room is locked to prevent any "unscreened" entry into the scan room in these situations or at any time.

There is a need for a system that allows the MRI technologist to activate an alarm while staying with the patient to provide immediate lifesaving care. Standard alarm systems cannot be used in the MRI environment, as installing a wall alarm would ruin the integrity of the faraday cage that shields the room from radio frequency waves. Also due to the high magnetic field of an MRI scanner, standard alarm systems become a safety issue due to the ferromagnetic properties of the alarm. An imaging technology alarm system according to the present disclosure may address the above problems experienced by an MRI Department. The imaging technology alarm system may be geared towards the MRI suite but can also easily be adapted to any environment that has the need for a rapid response or assistance by co-workers to compromising situations.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, an alarm system may include a first pneumatic actuation bulb positioned at a first location that includes no electronic components and a first pneumatic tubing connecting the first pneumatic actuation bulb to a first pneumatic switch coupled to an alarm console at a second location different from the first location. The alarm console and a first alarm of the alarm console may be configured to operate using electronic components. The first alarm may provide a first alarm signal responsive to usage of the first pneumatic actuation bulb. A second pneumatic actuation bulb may be positioned at the first location and connected to the alarm console via a second pneumatic tubing and a second pneumatic switch. The alarm console may include a second alarm that provides a second alarm signal responsive to usage of the second pneumatic actuation bulb.

Aspects of the present disclosure may relate to novel approaches to alert medical personnel of potential medical emergencies occurring in areas/rooms/departments that are staffed with only one person in the imaging room with the patient, and/or are isolated.

Aspects of the present disclosure may relate to novel adaptations of an existing device to alert medical personnel outside the room/area, department of potential medical emergencies with an audible, visual, and electronic alarm, when actuated by a healthcare professional.

Aspects of the present disclosure may relate to novel functions as an independent system or integrated into a complex hospital communication system and in any hospital or clinic situation.

Other aspects of the present disclosure may relate to methods of adapting MRI compatible alarm systems to be responsive to a technologist's need for emergency assistance.

The purpose of the present disclosure may relate to alert trained responders of an emergency in the MRI scanning room or any other room where the alarm is being used. At this point, there are no systems available in the MRI environment to call a code from the patient's side, or even from within the scan room. A selected staff will be trained on the institution's policies for the responder. The alarm may alert these trained responders to the fact that the MRI technologist needs immediate help inside the MRI scan room. An imaging technology alarm system according to the present disclosure may be a cost effective way of creating an alarm system that is important and an essential tool for improved patient care and safety. It will help to save critical time for patient care as well as relieve stress for the MRI technologist, or other Health Care Providers who perform a variety of exams or tasks on/with patients in an isolated environment. This alarm is also of value to the MRI field engineers who quite often are working in the MRI scan rooms independently. Accidents can and have occurred under these circumstances so this will improve safety and relieve stress for these engineers.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

The alarm may be powered by an AC connection. The alarm console may be located in the control room, actuated by a pneumatic bulb located within the isolated imaging room. The alarm console may provide a visual and/or an audible signal within the control room in concert with a signal to an auxiliary external alarm console and an electronic message at a USB port on the control alarm console. The auxiliary alarm console may provide a visual and/or an audible signal. The electronic message, from the USB port, can be supplied to a hospital/clinic computer or alternate communication system.

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. In addition, any measurements, specifications, and the like shown in the figure is intended to be illustrative, and not restrictive. Therefore, specific structural and functional details disclosed herein are not to be interpreted as limiting, but merely as a representative basis for teaching one skilled in the art to variously employ an imaging technology alarm system according to the present disclosure.

Embodiments of the present disclosure are explained with reference to the accompanying figures. Aspects of the present disclosure relate to novel approaches for the use and adaptation of pneumatic patient alarm systems to allow them to be responsive to the healthcare provider's need for emergency assistance.

Figure 1:
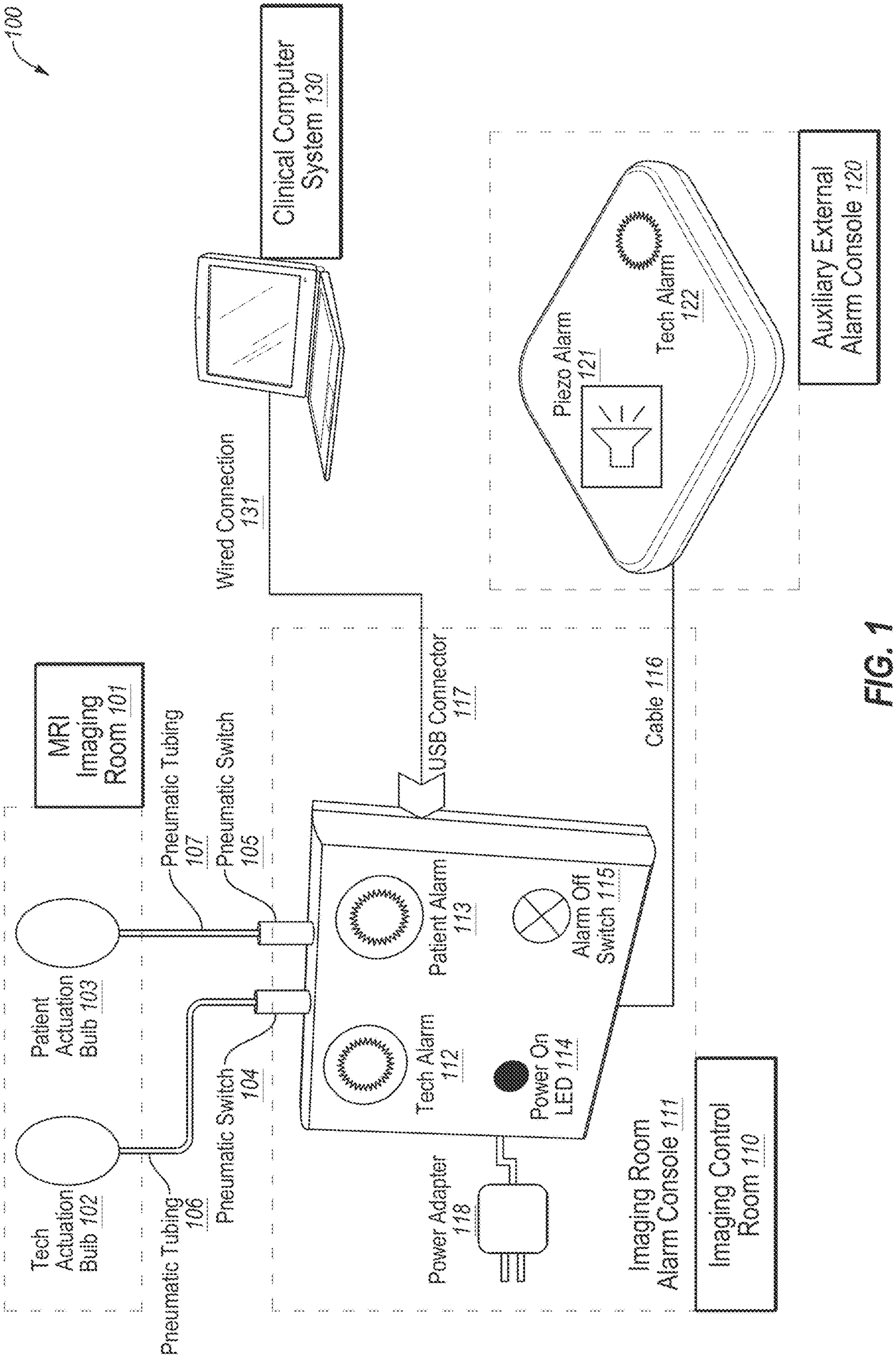
FIG. 1 is a diagram of an example embodiment of an imaging technology alarm system in accordance with one or more embodiments of the present disclosure.

FIG. 1 is a diagram of an example embodiment of an imaging technology alarm system 100 in accordance with one or more embodiments of the present disclosure. The imaging technology alarm system 100 may be powered by an AC connection. For example, an imaging room alarm console 111 may include a power adapter 118 that provides an AC connection to supply energy to the imaging room alarm console 111. Additionally or alternatively, the power adapter 118 may provide energy to the imaging room alarm console 111 through any other energy sources, such as a battery. The imaging technology alarm system 100 may include the imaging room alarm console 111 that is located in an imaging control room 110, actuated by a technologist actuation bulb 102 or a patient actuation bulb 103 located within an isolated MRI imaging room 101. The imaging room alarm console 111 may be powered on via a power on LED 114 or any other power switches. The imaging room alarm console 111 may provide a visual and/or audible signal within the imaging control room 110 in concert with a signal sent to an auxiliary external alarm console 120 via a cable 116 and an electronic message at a USB connector 117 on the imaging room alarm console 111. The auxiliary external alarm console 120 may provide a visual and/or audible external signal. The electronic message, from the USB connector 117, can be supplied to a clinical computer system 130 or any other communication system.

The imaging technology alarm system 100 may facilitate a new use for pneumatic alarm mechanisms used in MRI departments. Current pneumatic alarm devices often include a pneumatic bulb held by the patient during MRI Scans to alert the MRI technologist that the patient needs attention. The imaging technology alarm system 100 may adapt the current pneumatic alarm devices for new uses. One or more pneumatic bulbs may be installed to the front of a magnet bore so that the technologist may use the bulb to alert other trained staff members that the technologist has an emergency taking place in the MRI imaging room 101 without having to leave the patient's side. This could easily and similarly be adapted to in any other imaging and/or healthcare room to provide that same sense of security to the healthcare provider.

Responsive to the technologist actuation bulb 102 being squeezed by the technologist, a pneumatic switch 104 may be triggered. The triggered pneumatic switch 104 signals an on-board processor to energize an audible alarm and illuminate a bright flashing light corresponding to a tech alarm 112 on the imaging room alarm console 111 and an audible piezo alarm 121 and/or a visual tech alarm 122 on the auxiliary external alarm console 120. The on-board processor will also send a coded message to the USB connector 117 of the imaging room alarm console 111. One or more clinical computer systems 130 may be connected to, such as via a wired connection 131 (e.g., by a USB cable, Wi-Fi, Bluetooth, or any other communicative connection). This coded message may be structured to be accepted and read by a computer or other similar hospital communication system i.e. connected directly to the customer's network, integrated into a hospital alarm management platform, connected to a router providing for additional alarm signals to be programmed to automatically be forwarded to multiple parties in sequence or series, and capable of including customized or default messages that can be formatted to accompany the alarm signal or notification.

Once the emergency assistance has been implemented the alarm may be disabled by activating the alarm-off switch 115 on the imaging room alarm console 111. Additionally or alternatively, the alarm may include an additional pneumatic line for a patient actuation bulb 103. Responsive to the patient actuation bulb 103 being squeezed by the patient, a pneumatic switch 105 may be triggered. The triggered pneumatic switch 105 may signal the on-board processor to energize an audible alarm and illuminate a bright flashing light corresponding to a patient alarm 113 in the imaging room alarm console 111. The patient alarm 113 may be disabled by actuating the alarm-off switch 115 on the imaging room alarm console 111.

In some embodiments, the technologist actuation bulb 102 and/or the patient actuation bulb 103 (or bulbs with various mounting possibilities) may be color coded to distinguish the alarm system used by the technologist from the alarm system used by the patient. Pneumatic tubing 106 attached to the technologist actuation bulb 102 may be threaded through the floor raceway of the MRI imaging room 101 to a penetration panel on the wall (not shown). The pneumatic tube 106 may be inserted through a premade hole in the penetration panel and routed in the most effective and compliant way to the imaging room alarm console 111 next to the MRI technologist's desk in the imaging control room 110. Additionally or alternatively, a pneumatic tubing 107 may be used to connect the patient actuation bulb 103 to the penetration panel of the MRI imaging room 101. For example, the pneumatic tubing 107 may also be routed to and through the penetration panel to a corresponding port on the imaging room alarm console 111 such that the patient alarm 113 is communicatively coupled with operation of the patient actuation bulb 103. From the imaging room alarm console 111, the cable 116 may be routed in the most effective and compliant way to the auxiliary external alarm console 120. In some embodiments, the auxiliary external alarm console 120 may be positioned, for example, above the door at the entrance to the imaging control room 110 or at any other location outside of the imaging control room 110. The positioning of the auxiliary external alarm console 120 may differ depending on the floor plan and needs of each setting in which the imaging technology alarm system 100 may be installed.

In these and other embodiments, there may be other applications of the imaging technology alarm system 100 because MRI rooms may not be the only environment that involves a technologist working alone and being caught in a very precarious position with respect to patient emergencies occurs. Similar situations may occur in CT, nuclear medicine, ultrasound, mammography, X-ray, or other areas of the entire hospital and/or clinics that involve sensitive imaging processes.

In some embodiments, the imaging technology alarm system 100 may be added to any existing room or during installation of new imaging rooms for MRI, CT, nuclear medicine, ultrasound, mammography, X-ray, or in any other department deemed appropriate for increased safety to alert medical personnel outside of the imaging rooms of potential medical emergencies.

Figure 2:
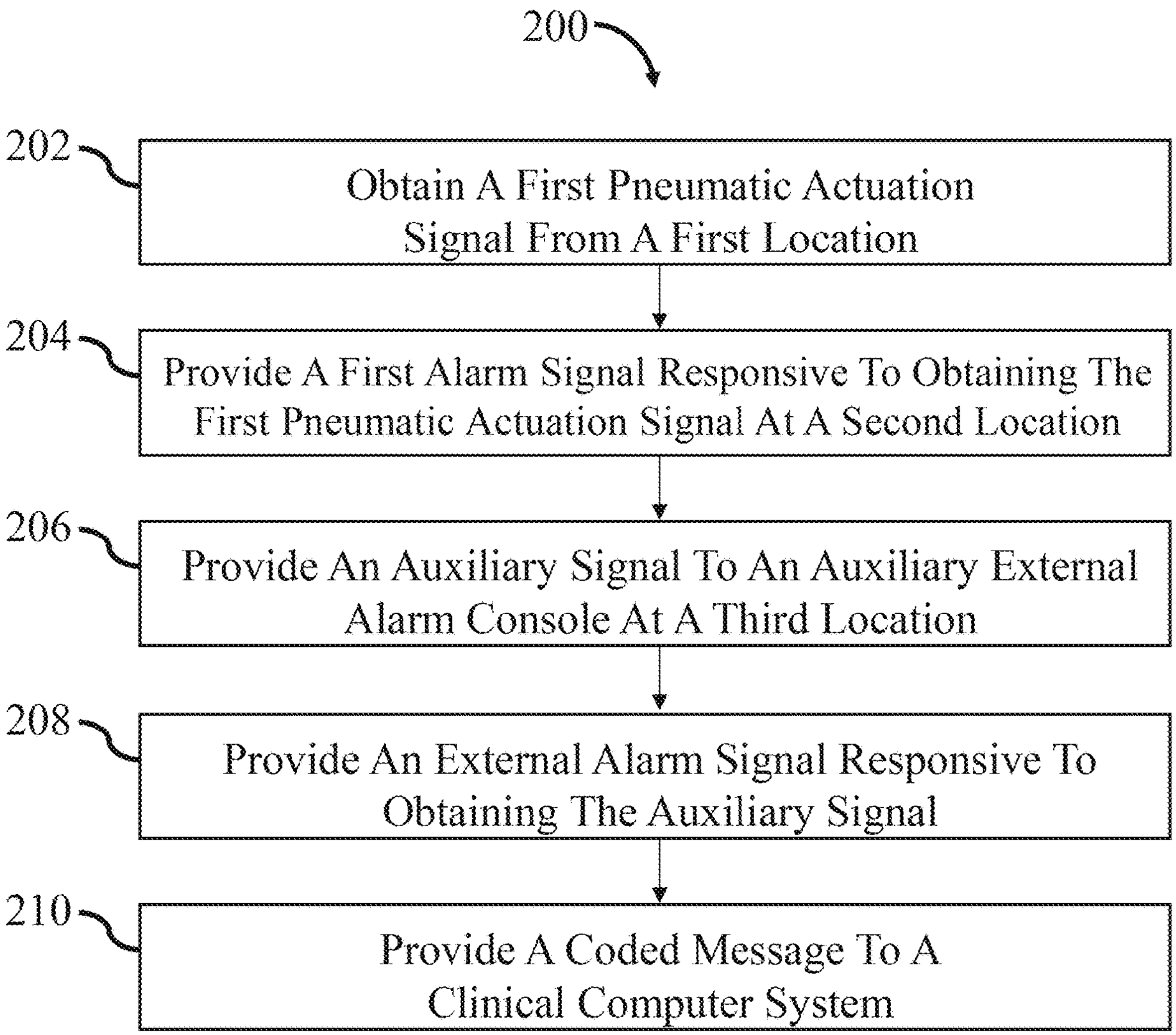
FIG. 2 is a flowchart of an example method of using an imaging technology alarm system according to one or more embodiments of the present disclosure.

FIG. 2 is a flowchart of an example method 200 of using an imaging technology alarm system according to one or more embodiments of the present disclosure. The method 200 may be performed by any suitable system, apparatus, or device. For example, the technologist actuation bulb 102, the patient actuation bulb 103, the imaging room alarm console 111, the auxiliary external alarm console 120, and/or the clinical computer system 130 of FIG. 1 may perform one or more operations associated with the method 200. Although illustrated with discrete blocks, the steps and operations associated with one or more of the blocks of the method 200 may be divided into additional blocks, combined into fewer blocks, or eliminated, depending on the particular implementation.

The method 200 may begin at block 202, where an alarm console may obtain a first pneumatic actuation signal from a first location. In some embodiments, the first pneumatic actuation signal may be an actuation signal from the technologist actuation bulb 102 as described in relation to the imaging technology alarm system 100 of FIG. 1, and the first location may be the MRI imaging room 101 of FIG. 1. Additionally or alternatively, the first pneumatic actuation signal may be an actuation signal from the patient actuation bulb 103. In some embodiments, the alarm console may obtain a second pneumatic actuation signal from the first location via a second pneumatic tubing and a second pneumatic switch on the alarm console. For example, the first pneumatic actuation signal may correspond to the technologist actuation bulb 102, while the second pneumatic actuation signal may correspond to the patient actuation bulb 103. In some embodiments, the first pneumatic actuation signal and/or the second pneumatic actuation signal may be obtained via pneumatic tubing threaded through a floor raceway of the MRI imaging room and inserted through a premade hole in a penetration panel to connect pneumatic actuation bulbs that are used to provide the first and/or the second pneumatic actuation signals.

At block 204, an alarm console may provide a first alarm signal responsive to obtaining the first pneumatic actuation signal at a second location. In some embodiments, the second location may be an imaging control room, such as the imaging control room 110 of the imaging technology alarm system 100 of FIG. 1. In some embodiments, the alarm console may provide a second alarm signal responsive to obtaining the second pneumatic actuation signal. In these and other embodiments, the first alarm signal may differ from the second alarm signal in some way such that the first alarm signal may be distinguished from the second alarm signal. For example, the first alarm signal may be a visual light indicator having a first color, while the second alarm signal may be a visual light indicator having a second color. As an additional or alternative example, the first alarm signal may be a first audio indicator, while the second alarm signal may be a second audio indicator that is different from the first audio indicator.

At block 206, the alarm console may provide an auxiliary signal to an auxiliary external alarm console at a third location responsive to the alarm console obtaining the first pneumatic actuation signal. The third location may be different from the first location and/or the second location. For example, the third location may be an external region outside of the MRI imaging room and/or the imaging control room.

At block 208, the auxiliary external alarm console may provide an external alarm signal responsive to obtaining the auxiliary signal. In some embodiments, the external alarm signal may be a visual and/or an audio indicator provided by the auxiliary external alarm console.

At block 210, the alarm console may provide a coded message to a clinical computer system responsive to the alarm console obtaining the first pneumatic actuation signal. In some embodiments, the coded message may include information relating to the first pneumatic actuation signal. In these and other embodiments, the clinical computer system may be integrated into a hospital alarm management platform that is configured to provide additional alarm signals to be forwarded to parties at the hospital. In some embodiments, providing the external alarm signal at block 208 and providing the coded message to the clinical computer system at block 210 may occur either sequentially or simultaneously.

Modifications, additions, or omissions may be made to the method 200 without departing from the scope of the disclosure. For example, the designations of different elements in the manner described is meant to help explain concepts described herein and is not limiting. Further, the method 200 may include any number of other elements or may be implemented within other systems or contexts than those described.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An alarm system, comprising:

a first pneumatic actuation bulb disposed in a first position at a first location that includes no electronic components;

a first pneumatic tubing connecting the first pneumatic actuation bulb to a first pneumatic switch coupled to a first alarm at a second location different from the first location;

a second pneumatic actuation bulb disposed in a second position at the first location; and a second pneumatic tubing connecting the second pneumatic actuation bulb to a second pneumatic switch coupled to a second alarm at a second location different from the first location, wherein the first alarm is coupled to the first pneumatic actuation bulb via the first pneumatic tubing and configured to provide a first alarm signal at the second location and at a third location different from the first location and the second location responsive to usage of the first pneumatic actuation bulb at the first location, wherein the second alarm is coupled to the second pneumatic actuation bulb via the second pneumatic tubing and configured to provide a second alarm signal at the second location responsive to usage of the second pneumatic actuation bulb at the first location, and wherein the first alarm and the second alarm are configured to operate using electronic components.

2. The alarm system of claim 1, wherein:

the first alarm is color coded to correspond to a first color of the first pneumatic actuation bulb; and the second alarm is color coded to correspond to a second color of the second pneumatic actuation bulb.

3. The alarm system of claim 1, wherein:

the first pneumatic actuation bulb is a tech actuation bulb operated by a technologist at the first location; and the second pneumatic actuation bulb is a patient actuation bulb operated by a patient at the first location.

4. The alarm system of claim 1, wherein:

the first location is a Magnetic Resonance Imaging (MRI) imaging room;

the second location is an imaging control room; and the third location is a location in a medical facility that is different from the Magnetic Resonance Imaging (MRI) imaging room and the imaging control room.

5. The alarm system of claim 4, wherein the first pneumatic tubing is threaded through a floor raceway of the MRI imaging room and inserted through a pre-made hole in a penetration panel to connect the first pneumatic actuation bulb to the first pneumatic switch.

6. The alarm system of claim 1, further comprising a clinical computer system communicatively coupled to the first alarm, wherein the first alarm is configured to send a coded message that provides information relating to usage of the first pneumatic actuation bulb to the clinical computer system.

7. The alarm system of claim 6, wherein the clinical computer system is integrated into a medical facility alarm management platform that is configured to provide one or more additional alarm signals to be forwarded to one or more parties at a medical facility.

8. The alarm system of claim 1, wherein the first alarm console includes an alarm-off switch that is configured to disable the first alarm signal responsive to actuation of the alarm-off switch.

9. The alarm system of claim 1, wherein the first position allows usage of the first pneumatic actuation bulb by a first person while a second person at least partially blocks access to the second pneumatic actuation bulb in the second position.

10. The alarm system of claim 9, wherein the first position is outside a bore of a Magnetic Resonance Imaging (MRI) apparatus and the second position is within the bore of the MRI apparatus.

11. A method, comprising:

in response to obtaining, at a first alarm console, a first pneumatic actuation signal from a first position in a first location that includes no electronic components, providing, by the first alarm console, a first alarm signal at a second location and at a third location, wherein the first location, the second location, and the third location are each different locations; and in response to obtaining at the first alarm console a second pneumatic actuation signal from a second position in the first location, providing, by the first alarm console, a second alarm signal at the second location.

12. The method of claim 11 wherein the first alarm signal is different from the second alarm signal.

13. The method of claim 11, wherein:

the first pneumatic actuation signal corresponds to actuation of a first pneumatic bulb configured to be operated by a technologist at the first location; and the second pneumatic actuation signal corresponds to actuation of a second pneumatic bulb configured to be operated by a patient at the first location.

14. The method of claim 11, wherein:

the first location is a Magnetic Resonance Imaging (MRI) imaging room; and the second location is an imaging control room; and the third location is a location in a medical facility that is different from the Magnetic Resonance Imaging (MRI) imaging room and the imaging control room.

15. The method of claim 14, wherein the first pneumatic actuation signal is obtained via pneumatic tubing threaded through a floor raceway of the MRI imaging room and inserted through a pre-made hole in a penetration panel to connect a pneumatic actuation bulb to a pneumatic switch on the first alarm console.

16. The method of claim 11, further comprising providing, by the first alarm console, a coded message to a clinical computer system responsive to the first alarm console obtaining the first pneumatic actuation signal, the coded message including information relating to the first pneumatic actuation signal.

17. The method of claim 16, wherein the clinical computer system is integrated into a medical facility alarm management platform that is configured to provide additional alarm signals to be forwarded to parties at a hospital medical facility.

18. The method of claim 11, further comprising:

obtaining, at the first alarm console, an alarm-off signal; and disabling the first alarm signal responsive to obtaining the alarm-off signal.

19. The method of claim 11, wherein the first position allows actuation of the first pneumatic actuation signal from a first pneumatic bulb by a first person while a second person at least partially blocks access to a second pneumatic bulb in the second position.

20. The method of claim 19, wherein the first position is outside a bore of a Magnetic Resonance Imaging (MRI) apparatus and the second position is within the bore of the MRI apparatus.

* * * * *